(12) United States Patent
Favergeon-Borgialli et al.

(10) Patent No.: US 8,245,011 B2
(45) Date of Patent: Aug. 14, 2012

(54) METHOD AND SYSTEM FOR GEOMETRY-BASED VIRTUAL MEMORY MANAGEMENT IN A TILED VIRTUAL MEMORY

(75) Inventors: Christophe Favergeon-Borgialli, Nice (FR); Jean-Christian Kircher, Roquefort les Pins (FR); Stéphane Sintes, Cannes (FR)

(73) Assignee: Texas Instruments Incorporated, Dallas, TX (US)

( * ) Notice: Subject to any disclaimer, the term of this patent is extended or adjusted under 35 U.S.C. 154(b) by 538 days.

(21) Appl. No.: 12/328,769

(22) Filed: Dec. 5, 2008

(65) Prior Publication Data

US 2009/0204784 A1 Aug. 13, 2009

(30) Foreign Application Priority Data

Feb. 8, 2008 (EP) .................................. 08290122
Nov. 21, 2008 (EP) .................................. 08291100

(51) Int. Cl.
*G06F 12/08* (2006.01)
*G06F 12/10* (2006.01)
*G06F 12/00* (2006.01)

(52) U.S. Cl. ........ 711/203; 711/202; 711/209; 345/543; 345/568

(58) Field of Classification Search .................. 711/202, 711/203, 209; 345/543, 568
See application file for complete search history.

(56) References Cited

U.S. PATENT DOCUMENTS

| | | | |
|---|---|---|---|
| 5,247,632 A | | 9/1993 | Newman |
| 5,247,634 A * | | 9/1993 | Cline et al. ............................. 1/1 |
| 5,461,712 A * | | 10/1995 | Chelstowski et al. ......... 345/543 |
| 6,252,612 B1 * | | 6/2001 | Jeddeloh ....................... 345/531 |
| 6,667,745 B1 | | 12/2003 | Hussain |
| 7,102,646 B1 * | | 9/2006 | Rubinstein et al. ........... 345/570 |
| 2005/0237329 A1 * | | 10/2005 | Rubinstein et al. ........... 345/531 |
| 2006/0202992 A1 | | 9/2006 | Nakatsuka et al. |
| 2008/0055325 A1 * | | 3/2008 | Seigneret et al. ............. 345/538 |
| 2008/0158601 A1 * | | 7/2008 | Tu et al. ....................... 358/1.16 |

OTHER PUBLICATIONS

McCormack, "Virtual Memory Tiling for Spatial Data Handling in GIS," Univ. of Leeds, School of Computer Studies, Research Report Series, Feb. 1996, pp. 1-14.*

(Continued)

*Primary Examiner* — Sanjiv Shah
*Assistant Examiner* — Glenn Gossage
(74) *Attorney, Agent, or Firm* — Ronald O. Neerings; Wade James Brady, III; Frederick J. Telecky, Jr.

(57) ABSTRACT

Methods and systems are provided for geometry-based virtual memory management. The methods and systems use Boolean space algebra operations to manage allocation and deallocation of tiled virtual memory pages in a tiled virtual memory provided by a tiled virtual memory subsystem. A region quadtree may be maintained representing a current allocation state of tiled virtual memory pages within a container. The region quadtree may be used to locate a rectangle or two dimensional (2D) array of unallocated tiled virtual memory pages, and physical memory pages may be mapped to tiled virtual memory pages in the rectangle by updating a lookup table used to translate tiled virtual memory page addresses to physical memory page addresses. A union or intersection of region quadtrees may be performed to generate a new region quadtree representing a new current allocation state of the tiled virtual memory pages.

10 Claims, 6 Drawing Sheets

OTHER PUBLICATIONS

McCormack et al, "Virtual Memory Tiling for Spatial Data Handling in GIS," Computers and Geosciences, vol. 23, No. 6, Jul. 1997, pp. 659-669.*

Qian et al, "A Systematic Strategy for High Performance GIS," Proceedings of the Thirteenth Symposium on Automated Cartography, Auto-Carto 13, Bethesda, MD.,1997, pp. 145-155.*

Newman, "Memory Management Support for Tiled Array Organization," ACM SIGARCH Computer Architecture News, vol. 20, Issue 4, Sep. 1992, pp. 22-30.*

Kuncak et al, "On the Boolean Algebra of Shape Analysis Constraints," MIT CSAIL Technical Report No. 916, VK0108, Aug. 2003, pp. 1-18.*

Samet, Hanan, "The Quadtree and Related Hierarchical Data Structures", Computing Surveys, vol. 16, No. 2, Jun. 1984, pp. 187-260.

Franklin, James, "Tiled Virtual Memory for UNIX", Summer 1992 USENIX, Jun. 8-12, 1992, San Antonio, Texas, pp. 99-106.

ATI Technologies, Inc., "ATI Radeon X800 3D Architecture White Paper", Apr. 2004, pp. 1-13.

* cited by examiner

METHOD AND SYSTEM FOR GEOMETRY-BASED VIRTUAL MEMORY MANAGEMENT IN A TILED VIRTUAL MEMORY

CROSS-REFERENCE TO RELATED APPLICATIONS

This application claims priority from European Patent Application No. 08290122.4 filed on Feb. 8, 2008 and European Patent Application No. 08291100.9 filed on Nov. 21, 2008.

BACKGROUND OF THE INVENTION

Many computer applications (e.g., image processing, graphics rendering, video processing, etc.) require the manipulation of large data arrays (e.g., frame buffers). Such applications benefit greatly from tiling, a technique in which the data arrays are partitioned and mapped to memory by software, hardware, or a combination thereof. Algorithms that manipulate the tiled data arrays often have dramatically reduced paging activity and execution times in such tiled virtual memory systems.

Some digital systems include specialized memory management hardware and operating system support for managing a tiled virtual memory that is shared by the applications. One such system is described in Franklin, James, "Tiled Virtual Memory for Unix," USENIX, June, 1992, pp. 99-106. In many such systems, a portion of physical memory is reserved for use as tile memory and tiled virtual memory management is implemented. Special memory mapping logic is present to translate array (i.e., two-dimensional) virtual addresses into tiled virtual memory addresses and ultimately into physical memory addresses. While the specialized software and hardware support improves performance of the applications that manipulate large data arrays, improvements in physical memory allocation and reduced complexity in managing the tiled virtual memory space are desired to further improve performance.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
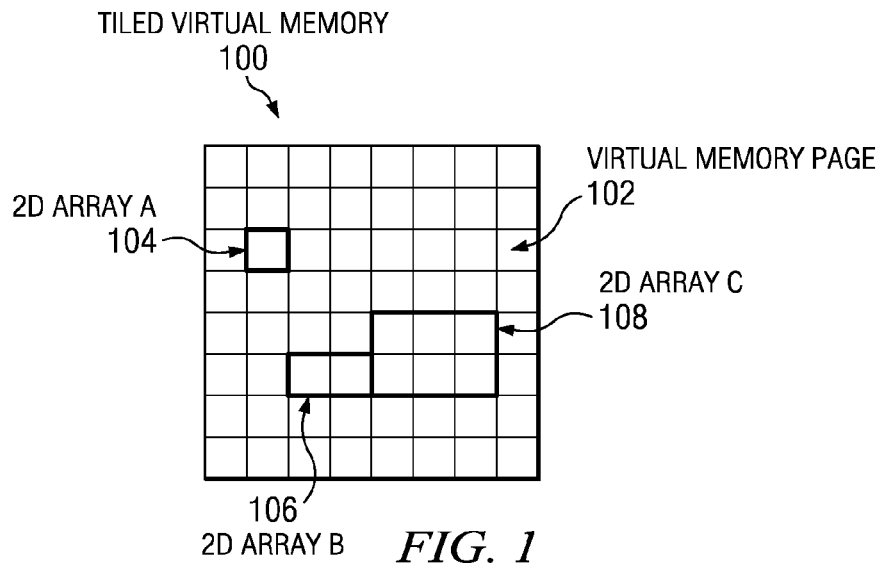
FIG. 1 shows a tiled virtual memory in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

Embodiments of the invention provide methods and systems for using Boolean space algebra to manage a tiled virtual memory provided by a tiled virtual memory subsystem. Tiling is a technique in which two-dimensional (2D) arrays are partitioned into a number of identically sized sub-arrays, and the sub-arrays are mapped (by hardware and/or software) to underlying virtual pages and/or physical pages of the same size as the sub-arrays. Further, a tiled virtual memory subsystem provides a tiled virtual memory in which 2D arrays are allocated as rectangles of contiguous virtual memory pages which are in turn mapped to physical memory pages. In other words, as shown in FIG. 1, a tiled virtual memory (100) may be seen as a rectangle of contiguous virtual memory pages (e.g., virtual memory page (102)) in which 2D arrays (104, 106, 108) are allocated (and addressed) in the tiled virtual memory (100) as sub-rectangles of contiguous virtual memory pages.

The tiled virtual memory subsystem also translates the 2D virtual addresses of the 2D arrays allocated in the tiled virtual memory into physical addresses in the mapped physical memory pages. Embodiments of the invention provide for allocating physical memory pages for use by a tiled virtual memory subsystem on an as-needed basis, i.e., for assigning physical memory pages to only those virtual memory pages in the tiled virtual memory that are allocated to 2D arrays.

More specifically, embodiments of the invention provide for managing the allocation and deallocation of two-dimensional (2D) arrays (e.g., frame buffers) in a tiled virtual memory using Boolean space algebra, and allocating physical memory pages to only those tiled virtual memory pages that are allocated to 2D arrays. In one or more embodiments of the invention, a resource manager (i.e., a tiled virtual memory manager) for a tiled virtual memory subsystem manages the allocation of space in the tiled virtual memory using a quadtree representation of the tiled virtual memory, and Boolean operations, e.g., union, intersection, etc., to add and remove virtual page allocations in the quadtree. When the resource manager receives a request to allocate a 2D array, Boolean operations on the quadtree are used to allocate a two-dimensional area (i.e., a rectangle of contiguous virtual memory pages) for the 2D array in the tiled virtual memory. The resource manager then maps physical memory pages to the allocated virtual memory pages. When the resource manager receives a request to deallocate the 2D array, Boolean operations on the quadtree are used to deallocate the two-dimensional area assigned to the 2D array, and the physical pages mapped to the virtual memory pages are released for other use. Further, an application programming interface (API) is provided that allows allocation requests and access requests to be made as two-dimensional requests, i.e., by specifying the height and width of a 2D array.

Figure 2:
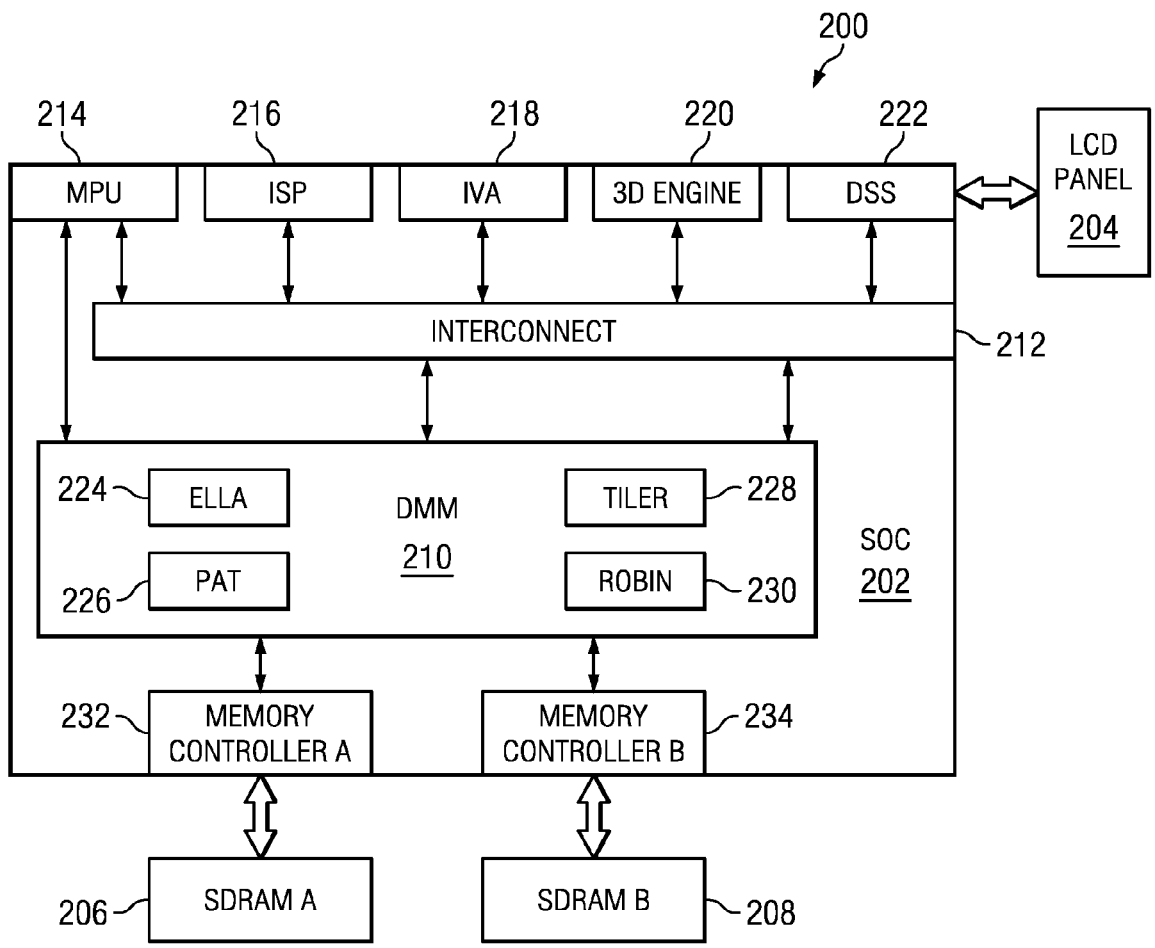
FIG. 2 shows a block diagram of an illustrative digital system configured to provide tiled virtual memory management in accordance with one or more embodiments of the invention.

FIG. 2 is a block diagram of a digital system configured to provide tiled virtual memory in accordance with one or more embodiments of the invention. The components of the digital system (200) of FIG. 2 include a system on a chip (SOC) (202), a liquid crystal display (LCD) panel (204), and external memory, i.e., synchronous dynamic random access memory (SDRAM) A (206) and SDRAM B (208). The LCD panel (204) provides display functionality for software executing on the digital system (200) and the external memory provides physical memory storage the software. While SDRAM is shown, any suitable memory may be used. Similarly, while an LCD panel is shown, any suitable display technology may be used.

The components of the SOC (202) include a main processing unit (MPU) (214), an image signal processor (ISP) (216), an image video accelerator (IVA) (218), a three dimensional (3D) engine (220), a display subsystem (DSS) (222) coupled via an interconnect (212) to a dynamic memory manager (DMM) (210) which is coupled to two memory controllers, i.e., memory controller A (232) and memory controller B (234). The MPU (214) may be any suitable general purpose 32-bit processor and the ISP (216) may be any suitable digital signal processor. The IVA (218) provides hardware acceleration for image, audio, and video encoding/decoding for multiple standards (e.g., MPEG4, Windows Media Video 9 (WMV 9 or WMV9), RealVideo®, H.263, H.264). RealVideo® is a registered trademark of RealNetworks, Inc. As is well known to one of ordinary skill in the art, MPEG4, also sometimes referred to as MPEG-4, is the commonly used designation for a video encoding standard developed by the Motion Picture Experts Group (MPEG) working group of the International Organization for Standardization/International Electrotechnical Commission (ISO/IEC). As is well known to one of ordinary skill in the art, H.263 and H.264 are commonly used designations for respective well known video compression standards developed by the International Telecommunication Union (ITU) Telecommunication Standardization Sector (ITU-T) Video Coding Experts Group (VCEG). The 3D engine (220) provides hardware acceleration for three dimensional graphics processing. The DSS (222) manages the display (204) and may provide some processing features such as, for example, mirroring, windowing, cropping, camera preview, and TV-out for Phase Alternating Line/National Television System Committee (PAL/NTSC) standards. The memory controllers (232, 234) provide interfaces to the physical memory (206, 208). More or fewer memory controllers and/or physical memories may be used in embodiments of the invention.

The DMM (210) is a module that manages various aspects of memory accesses including initiator-indexed priority generation, multi-zone SDRAM memory interleaving (when coupled to more than one memory controller), tiling and sub-tiling conversions of tiled memory access requests (discussed in more detail below in reference to the TILER (228), on-the-fly basic isometric transforms such as quadrant rotations and mirroring, and centralized low-latency page translation. In one or more embodiments of the invention, tiling refers to subdividing a two-dimensional (2D) array of elements (e.g., a frame buffer) into "tiles" of the same size as a page supported by the physical memory (e.g., a 1-KB memory page supported by the SDRAMS (206, 208)) and sub-tiling refers to subdividing a tile into smaller two-dimensional sub-sections of the same size as a memory transfer burst supported by the physical memory (e.g., 128-bit incremental bursts supported by the SDRAMS (206, 208)). Further, an initiator is a hardware block (e.g., the MPU (214), the ISP (216), the IVA (218), etc.) that can initiate a transfer of data to from memory (e.g., SDRAM A (206), SDRAM B (208)). In one or more embodiments of the invention, the DMM (210) is configured according to the Open Core Protocol (OCP) 2.2 specification and/or later versions of the OCP specification.

OCP is a core connection standard that defines interconnection (i.e., a signal exchange protocol) between two semiconductor cores on a single integrated circuit. The OCP standard is promoted and supported by the OCP International Partnership Association, INC. (OCP-IP). Information about OCP-IP is available at OCPIP.org. The OCP 2.2 specification includes support for two-dimensional block burst sequences to support the implementation of graphics or video processing subsystems that interact with two-dimensional frame buffers stored in external memory. The OCP-defined block burst sequence encodes all of the required information to complete an entire two-dimensional burst to memory in a single request, enabling both higher interface performance and providing memory controllers with the ability to optimize physical page accesses to improve memory throughput. In addition to the starting address and length (in the case of a two-dimensional transfer request, the length of each line), the two-dimensional transfer request also transmits a height (the number of lines in the block) and a stride (the offset from the beginning of one line to the beginning of the next).

As shown in FIG. 2, the DMM (210) includes an extra low latency access (ELLA) component (224), a physical address translator (PAT) component (226), a tiling and isometric lightweight engine for rotation (TILER) (228), and a re-ordering buffer and initiator node (ROBIN) (230). The interconnect (212) includes functionality to ensure that only virtually-addressed requests from initiators are directed to the TILER (228) and that only physically-addressed requests from initiators are directed to the ELLA (224).

The ROBIN (230), which is coupled to an OCP master port in one or more embodiments of the invention, includes logic to initiate requests from the ELLA (224) or the TILER (228) to the memory controllers (232, 234), to convert data and responses between raster and sub-tiled organizations, and to reconstruct bursts spanned between the memory controllers (206, 208). Functionality of the ROBIN (230) includes request forwarding, write data and response buffering, bypass for low latency initiators, maintenance of write data ordering, intra-word tiling and orientation transforms, and tag handling.

The ELLA (224), which is coupled to an OCP slave port in one or more embodiments of the invention, provides for low latency access to the physical memory. The ELLA (224) handles only one-dimensional bursts and does not interact with the PAT (226). The primary role of the ELLA (224) is to split incoming physical memory requests into requests that fit in a single SDRAM (206, 208) page. The ELLA (224) includes logic to manage its slave OCP port according to at least the OCP 2.2 specification (set forth in sub-section 2.1.2), to allocate an internal response context to timely generate the appropriate responses to memory access requests, and to request buffer allocation in the ROBIN (230). When multiple ROBINS are present, the ELLA (224) also includes logic to, in the case of a write request, allocate and update an internal write context to subsequently direct incoming write data to the appropriate ROBIN.

The PAT (226) includes a memory (also referred to as a lookup table (LUT)) that is used to translate tiled virtual memory page addresses to physical memory page addresses, and logic to trigger and fetch a block of entries from the memory. More specifically, the LUT stores indices for physical memory pages mapped to tiled virtual memory pages. Each entry in the LUT corresponds to a single tiled virtual memory page and is accessed by an index derived from the virtual address of the corresponding tiled virtual memory page. In digital systems that include more than one TILER (228), the PAT (226) includes multiple LUTs to maximize occurrences of parallel fetches.

The TILER (228) provides support for two-dimensional, virtually addressed block transfers for initiators that handle two-dimensional (2D) arrays such as video macro blocks, LCD frame buffers, images, etc. In some embodiments of the invention, the TILER (228) implements an "isometric-friendly" tiling structure (described below) that provides high efficiency zero-copy on-the-fly rotation and reflection of 2D arrays. In some embodiments of the invention, the function of the TILER (228) is to map a 2D virtual address in an OCP request from an initiator into one or more physically-addressed OCP requests by transforming the 2D virtual address and other information in the virtually-addressed request to match the requested 0°, 90°, 180°, or 270° orientation in a tiled virtual memory and optionally translating the oriented tiled address by a page-specific vector to manage memory fragmentation and physical object aliasing.

In one or more embodiments of the invention, the TILER (228) includes a four gigabyte (4 GB) tiled virtual memory that is addressed using a two-dimensional virtual addressing scheme. As is explained in more detail below, a 2D array is allocated as a contiguous 2D set of tiled virtual memory pages, i.e., a rectangle, in the tiled virtual memory of the TILER (228) and is addressed by a 2D virtual addressing scheme, but is mapped to a set of physical memory pages which may be noncontiguous.

The tiled virtual memory of the TILER (228) is divided into eight 512 megabyte (MB) virtual sub-spaces—or views—that correspond to each of the eight possible ways of scanning a frame buffer: from left to right then from top to bottom, from right to left then from top to bottom, from left to right then from bottom to top, from right to left then from bottom to top, from top to bottom then from left to right, from top to bottom then from right to left, from bottom to top then from left to right, and from bottom to top then from right to left. The uniquely addressable entry point of the tiled virtual memory of the TILER (228) is a container, which is a 128 MB virtual address space in which all objects of the same kind—and orientation—are allocated. In some embodiments of the invention, four types of containers are provided, each type of container being referred to by a mode: an 8-bit element mode, for efficiently accessing two-dimensional arrays of 8-bit data; a 16-bit element mode, for efficiently accessing two-dimensional arrays of 16-bit data; a 32-bit element mode, for efficiently accessing two-dimensional arrays of 32-bit data; and a page mode, for efficient one-dimensional accesses. Each of the eight 512 MB views includes four 128 MB containers, one for each of the different modes.

In some embodiments of the invention, each of the four modes may have a private page-grained LUT in the PAT (226). That is, one LUT may be bound to the exclusive usage of all 8-bit mode virtual containers, another to 16-bit mode virtual containers, a third to 32-bit mode virtual containers and a fourth one to page mode virtual containers. In such embodiments, up to 512 MB (4×128 MB) can be dynamically allocated at a page granularity exclusively for the TILER (228). Provided that each allocated page belongs to only one TILER (128) LUT, each mode can manage up to 128 MB of 2D arrays. In other embodiments of the invention, a single LUT can be shared by all TILER (228) modes at the expense of managing a maximum of 128 MB of 2D arrays among all TILER (228) modes. In such embodiments, if the four modes have virtual 128 MB containers, these containers are all mapped to the same piecewise 128 MB physical address space. Said differently, these four containers are all different specific isomorphic images of a single "scattered" 128 MB physical space. Consequently, in this configuration, no more than 128 MB of 2D arrays can be available simultaneously in a TILER (228) view.

Figure 3A:
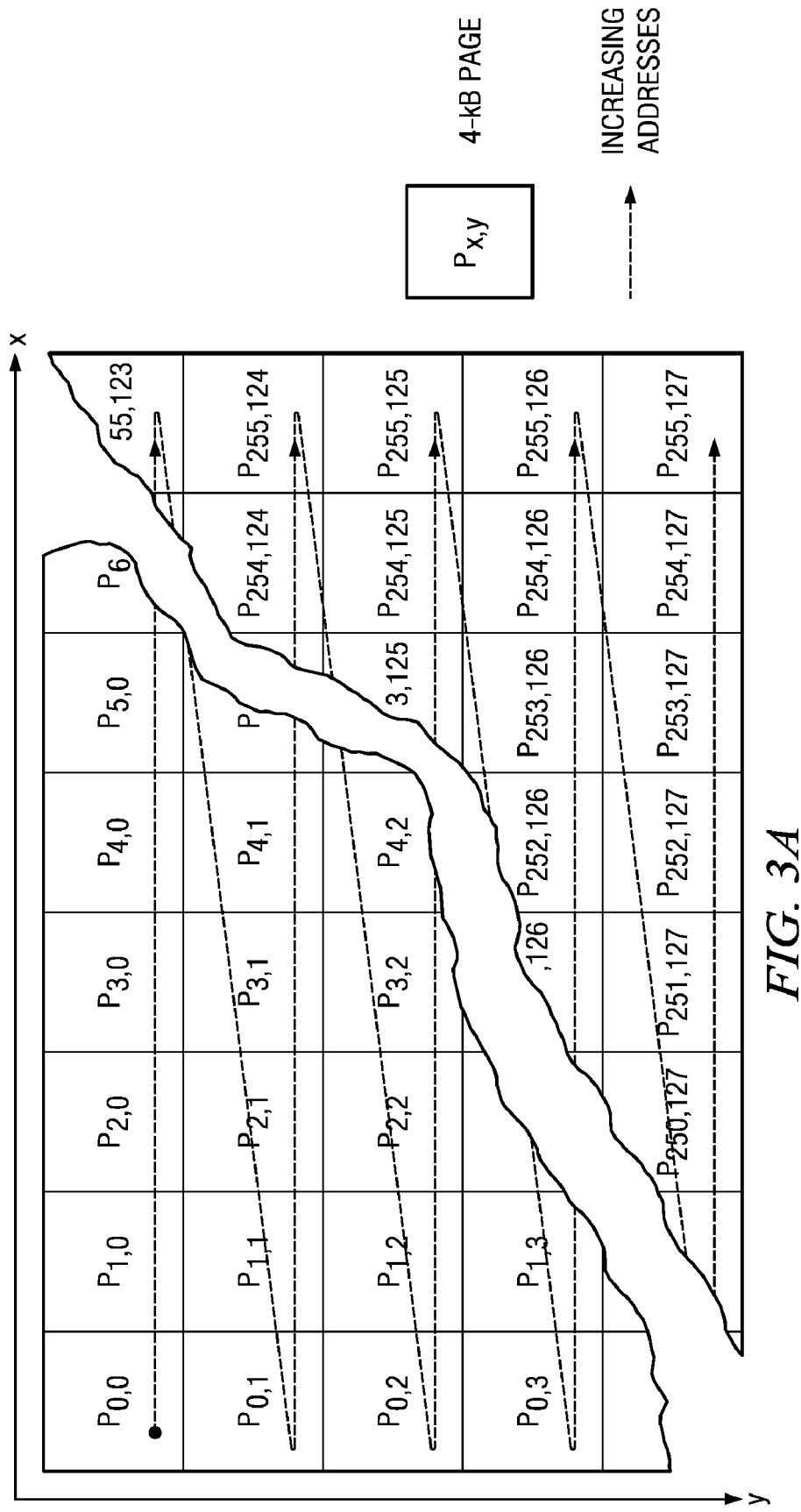
FIGS. 3A and 3B show the organization of a tiled virtual memory in accordance with one or more embodiments of the invention.

A tiled virtual memory page defines the granularity of object allocation in the containers. That is, the size of a tiled virtual memory page defines the granularity of physical memory allocation in the containers. In one or more embodiments of the invention, the TILER (228) may manage tiled virtual memory page sizes of 4 kilobytes (KB), 16 KB, or 64 KB and is statically configured at design time to support one of these tiled virtual memory page sizes. Further, in some embodiments of the invention, the tiled virtual memory page size is required to be a multiple of the physical memory page size of the memory management unit (MMU) of the MPU (214). For purposes of description herein, the MMU of the MPU (214) is assumed to support a physical memory page size of 4-KB and the tiled virtual memory page size is assumed to be 4 KB. With these assumptions, each of the 128 MB containers is a set of 32768 virtual memory pages organized in an array of 256 columns and 128 rows as shown in FIG. 3A. Further, in each container, the 4-KB page $P_{x,y}$ at column x ($0 \leq x < 256$) and row y ($0 \leq y < 128$), is found at an offset of 4096(x+256y) bytes from the base address of the container. Also, in some embodiments of the invention, the page $P_{x,y}$ at column x ($0 \leq x < 256$) and row y ($0 \leq y < 128$), is translated by the LUT entry found at the index x+256y. One of ordinary skill in the art will understand embodiments of the invention that support other page sizes without further detailed description.

Figure 3B:
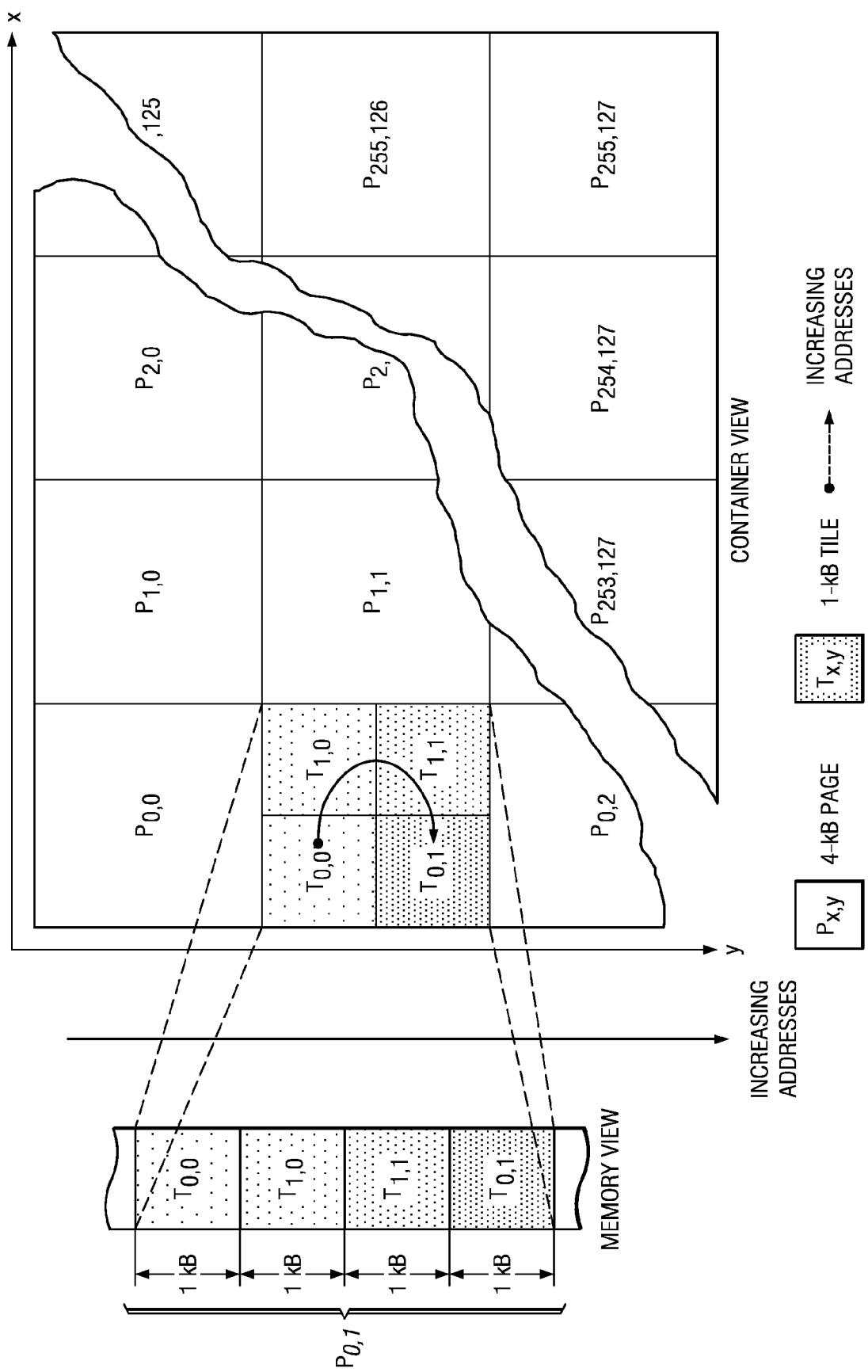

In the TILER (228), a tile is a subdivision of a tiled virtual memory page. In one Or more embodiments of the invention, a tile is sized to fit into a single SDRAM memory page In order to minimize the number of SDRAM memory page openings required for a two- Dimensional block transfer. In one or more embodiments of the invention, a tile is a 1. KB 2D Block and each 4KB tiled virtual memory page is an array of two lines of two tiles each. In one or more embodiments of the invention, tiles are ordered in a page along a zigzag path that starts from the top-left corner of the page and goes through each line of tiles to the bottom-right corner of the page as illustrated in FIG. 3B. With this ordering, the tile $T_{x,y}$ at column x ($0 \leq x<2$) and row y ($0 \leq y<2$) of a tiled virtual memory page is found at an offset of 1024(x×y2xy) bytes from the base address of the page.

In the TILER (228), a sub-tile is an addressable subdivision of a tile. In one or more embodiments of the invention, a sub-tile is aimed at lowering the size (length×height) of memory transfer bursts to more efficiently handle relatively small 2D block requests such as video macro-blocks. In one or more embodiments of the invention, a sub-tile is a 128 bit 2D block and a tile is an array of eight lines of eight sub-tiles. In such embodiments, the sub-tile $S_{x,y}$ at column x ($0 \leq x<8$) and row y ($0 \leq y<8$) of any tile in any tiled mode is found at an offset of 16(x+8y) bytes from the base address of the tile. For example, the sub-tile $S_{0,1}$ of a tile is always located at an offset of 128B or 16(0+8×1) from the base address of the tile.

The TILER (228) translates a virtual 2D transfer request from an initiator into physically addressed requests that are sent to the relevant memory controller (232, 234). More specifically, a virtual 2D transfer request is decoded by the TILER (228) to extract the element size—8-bit data, 16-bit data, 32-bit data or page and the isometric transform to apply, and the request is converted into one or more physical memory requests. As a part of the conversion process, the TILER (228) translates the request to one more tiled virtual memory page addresses, and then uses indices derived from these tiled virtual memory page addresses to locate the indices of the physical memory pages mapped to the tiled virtual memory pages in the LUT. The TILER (228) then uses these physical memory page indices to generate physical addresses for the physical memory requests. Each physical memory request is transmitted to the ROBIN (230) to be directed to the appropriate memory controller (232, 234). For a write request, the TILER (228) writes all incoming data into the ROBIN (230). Similarly, for a read request, the TILER (228) fetches the requested data from the ROBIN (230) and returns it to the requesting initiator.

Figure 4:
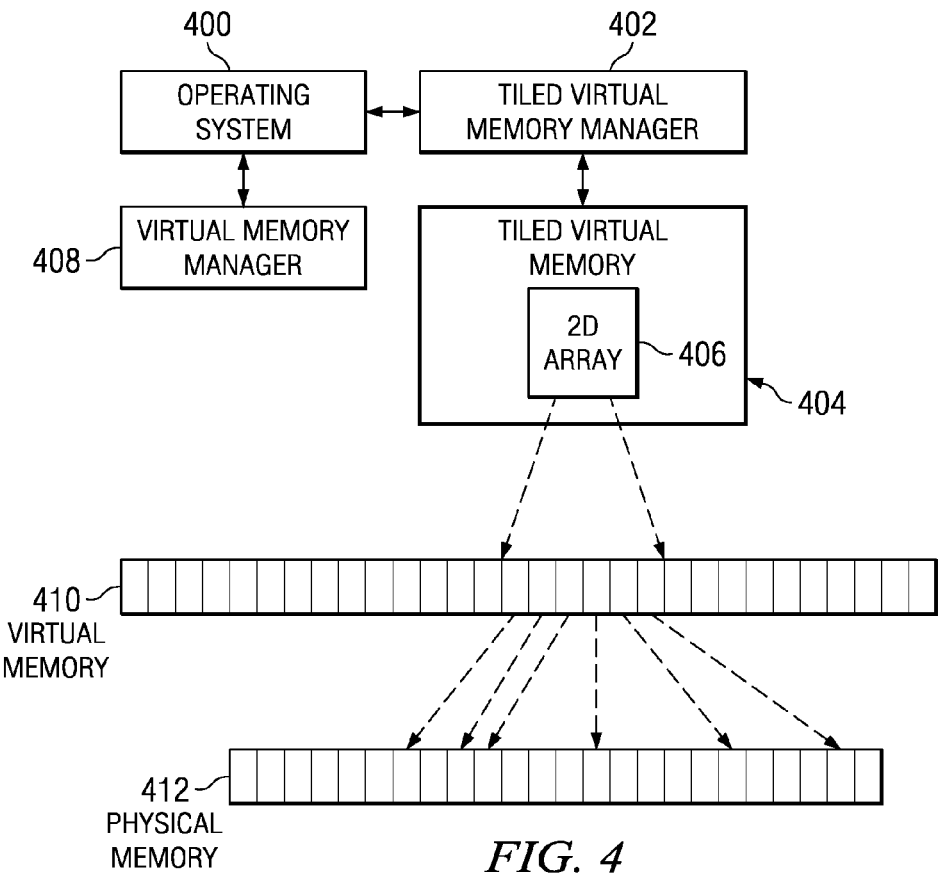
FIG. 4 shows a block diagram of tiled virtual memory management in the digital system of FIG. 2 in accordance with one or more embodiments of the invention.

In one or more embodiments of the invention, as shown in FIG. 4, the digital system (200) also includes an operating system (400), a virtual memory manager (408), and a tiled virtual memory manager (402) that execute on the MPU (214). The operating system (400) may be any suitable high level operating system such as, for example, the Linux®, Microsoft® Windows Mobile, and Symbian™ operating systems. The operating system (400) includes functionality to receive virtual memory (410) allocation and deallocation requests from the tiled virtual memory manager (402) and to return the addresses of physical memory (412) pages assigned to the allocated virtual memory (410) pages to the tiled virtual memory manager (402) in response to an allocation request. The virtual memory manager (408) includes functionality to manage the allocation and deallocation of pages in the virtual memory (410) of the MPU (214) as requested by the operating system. The virtual memory manager (408) also includes functionality to map pages of physical memory (412) to virtual memory pages when the virtual memory pages are accessed and to translate virtual addresses within virtual memory pages to physical addresses in the mapped physical pages.

The tiled virtual memory manager (402) includes functionality to manage the allocation and deallocation of 2D arrays (e.g., 2D array (404)) in the tiled virtual memory (406) (i.e., the virtual address space of the TILER (228)) and to map physical memory pages to allocated 2D arrays. In one or more embodiments of the invention, the tiled virtual memory manager (402) includes an application programming interface (API) (not shown) to be used by the operating system (400) to request the allocation and/or deallocation of a 2D array in the tiled virtual memory (404).

More specifically, a software application (not shown) executing on the operating system (400) may use functionality in the operating system (400) to request the allocation of a 2D array. In response to this allocation request, the operating system (400) uses the API of the tiled virtual memory manager (402) to request the allocation of the 2D array (e.g., 2D array (406)) in the tiled virtual memory (404). The request may include the length and width of the 2D array, the orientation, and the element size of the array. The tiled virtual memory manager (402) uses the orientation and element size to determine the appropriate container in the tiled virtual memory (404) for the 2D array. As is explained in more detail below, the tiled virtual memory manager (402) then allocates a 2D area of contiguous tiled virtual memory pages, i.e., a rectangle of pages, in the container for the 2D array. The tiled virtual memory manager (402) uses functionality in the operating system (400) to request allocation of physical memory pages to be mapped to the tiled virtual memory pages allocated for the 2D array.

As shown in FIG. 4, in some embodiments of the invention, the operating system (400) causes the allocation of the physical memory pages by requesting that the virtual memory manager (408) allocate the number of contiguous virtual memory pages in the virtual memory (410) that would be needed to hold the 2D array if the array were actually allocated in the virtual memory (410), and map pages of the physical memory (412) to the allocated virtual memory pages. The mapped physical memory pages are not necessarily contiguous pages in the physical memory (412). The operating system (400) further requests that the virtual memory pages be locked so that the mapped physical memory pages cannot be used for any other purpose by the virtual memory manager (408). Once the virtual memory pages are allocated and the physical memory pages are mapped to them, the addresses of the physical memory pages are provided to the tiled virtual memory manager (402).

After receiving the addresses of the physical memory pages, the tiled virtual memory manager maps the physical memory pages to the tiled virtual memory pages allocated for the 2D array by programming the PAT (226) to associate the indices of the assigned physical memory pages with LUT entries for the corresponding tiled virtual memory pages. Once the PAT (226) is programmed, the tiled virtual memory manager (402) returns the 2D virtual address of the allocated 2D array to the operating system (400) which returns the 2D virtual address to the software application.

A software application may also use functionality in the operating system (400) to request the deallocation of a 2D array. In response to this deallocation request, the operating system (400) uses the API of the tiled virtual memory manager (402) to request the deallocation of the 2D array (e.g., 2D array (406)) from the tiled virtual memory (404). The request includes the 2D virtual address of the 2D array in the tiled virtual memory (404). The tiled virtual memory manager (402) uses the 2D virtual address to determine the container in the tiled virtual memory (404) for the 2D array. As is explained in more detail below, the tiled virtual memory manager (402) then deallocates the 2D area of tiled virtual memory pages in the container for the 2D array and programs the PAT (226) to unmap the physical memory pages mapped to the deallocated tiled virtual memory pages. The tiled virtual memory manager (402) also uses functionality in the operating system (400) to release the physical memory pages. The operating system (400) releases the physical memory pages by requesting that the virtual memory manager (408) deallocate the virtual memory pages that were reserved when the 2D array was originally allocated and unlock the pages of the physical memory (412) assigned to those virtual memory pages.

The tiled virtual memory manager (402) uses Boolean shape algebra to encode the geometry of the areas of tiled virtual pages currently in use in the tiled virtual memory (404). As would be known by one of ordinary skill in the art, Boolean algebra is defined as a six-tuple consisting of a set A, equipped with two binary operations $\land$(called "meet" or "and"), $\lor$(called "join" or "or"), a unary operation $\neg$(called "complement" or "not") and two elements 0 and 1 (sometimes denoted by $\bot$ and T), such that for all elements a, b and c of A, the following axioms hold:

| | | |
|---|---|---|
| $a \lor (b \lor c) = (a \lor b) \lor c$ | $a \land (b \land c) = (a \land b) \land c$ | associativity |
| $a \lor b = b \lor a$ | $a \land b = b \land a$ | commutativity |
| $a \lor (a \land b) = a$ | $a \land (a \lor b) = a$ | absorption |
| $a \lor (b \land c) =$ | $a \land (b \lor c) =$ | distributivity |
| $(a \lor b) \land (a \lor c)$ | $(a \land b) \lor (a \land c)$ | |
| $a \lor \neg a = 1$ | $a \land \neg a = 0$ | complements |

Boolean shape algebra is based upon sets. The operations are set union, set intersection, and set complement, and the axioms of Boolean algebra hold for these operations. Further, in Boolean shape algebra, any operation between shapes produces another shape. As is explained in more detail below, in one or more embodiments of the invention, a shape is defined to be a union of tiled virtual memory pages, and union, intersection, and complement operations are defined to perform on unions of tiled virtual memory pages. Further, these operations are defined such that any operation between unions of tiled virtual memory pages results in a union of tiled virtual memory pages. For example, an intersection of two unions of tiled virtual pages results in a union of tiled virtual memory pages.

In one or more embodiments of the invention, the tiled virtual memory manager (402) uses one or more region quadtrees to encode the current state of tiled virtual memory page allocations in the tiled virtual memory (404), and uses Boolean algebra operations to update the quadtree when a 2D array is allocated or deallocated. In some embodiments of the invention, the tiled virtual memory manager (402) maintains one quadtree per TIILER (228) container. In general, a quadtree is a tree data structure in which each internal node has up to four children. A region quadtree represents a partition of space in two dimensions by decomposing a 2D region into four equal quadrants, subquadrants, and so on with each leaf node containing data corresponding to a specific subregion. Each node in the region quadtree either has exactly four children or is a leaf node having no children. Each child of a node represents a quadrant of the region represented by that node. The root node represents the entire region. Accordingly, in one or more embodiments of the invention, the root node of the region quadtree used by the tiled virtual memory manager (402) represents the container. Further, a leaf node in this quadtree represents a quadrant/subquadrant of tiled virtual memory pages in which all of the pages are allocated or all of the pages are unallocated. While a leaf node may include any number of tiled virtual memory pages, the smallest leaf node in some embodiments of the invention is a single tiled virtual memory page.

Figure 5A:
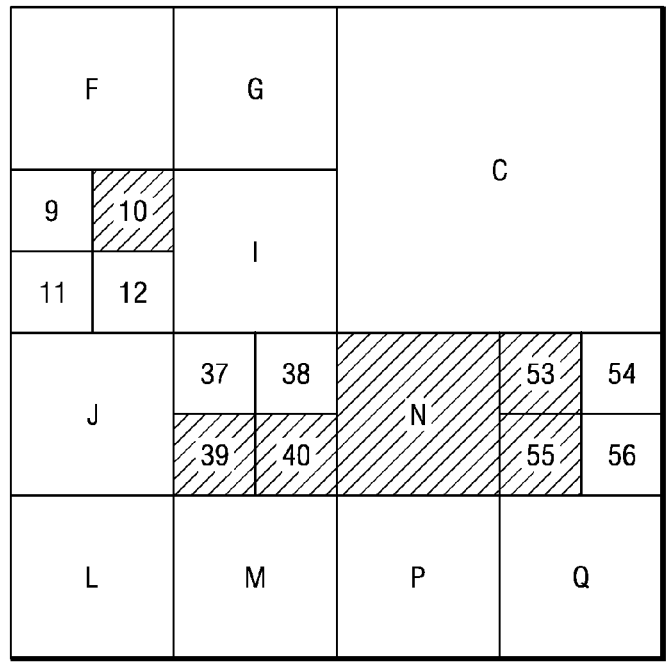
FIGS. 5A and 5B show an example of a region quadtree encoding the current state of tiled virtual memory allocations in the tiled virtual memory shown in FIG. 1 in accordance with one or more embodiments of the invention.
Figure 5B:
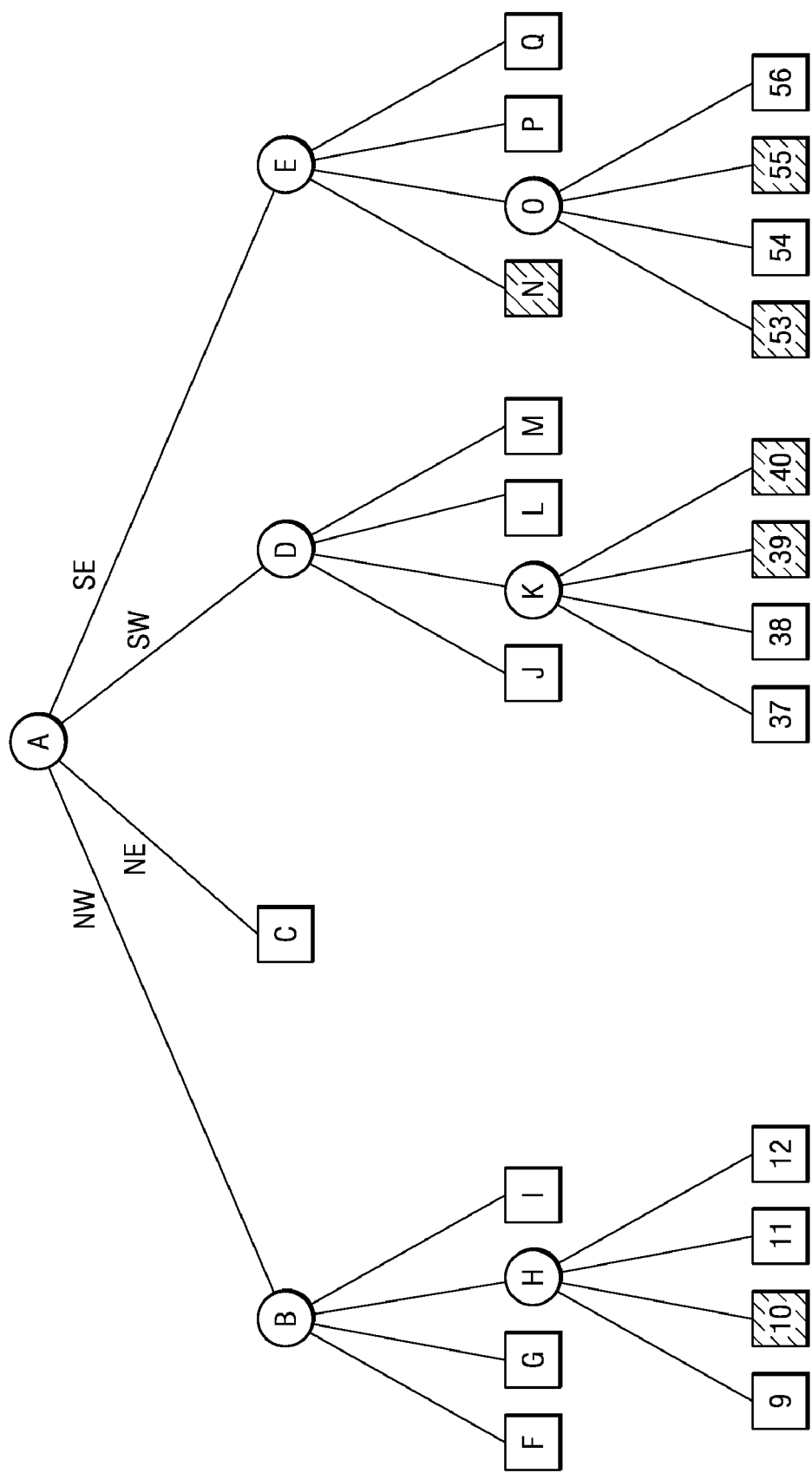

FIGS. 5A and 5B show an example of a region quadtree encoding the current state of tiled virtual memory allocations in the tiled virtual memory (100) shown in FIG. 1. FIG. 5A shows the decomposition of the tiled virtual memory (100) into quadrants and subquadrants based on the allocation of 2D array A (104), 2D Array B (106), and 2D array C (108) in the memory. The shaded subquadrants (e.g., subquadrant N) are quadrants in which all of the tiled virtual memory pages are allocated. Further, each of the subquadrants in this decomposition will be leaf nodes of the nodes representing their respective regions. For example, quadrant N will be a leaf node of the node representing the southeast quadrant of the tiled virtual memory (100)) and quadrant C will be a leaf node of the root node. FIG. 5B shows the quadtree that represents the decomposition of FIG. 5A. In this example, the squares are leaf nodes with a shaded square indicating that all of the tiled virtual memory pages in the quadrant represented by the leaf node are allocated and a white square indicating that all of the tiled virtual memory pages in the quadrant represented by the leaf node are not allocated.

Figure 6A:
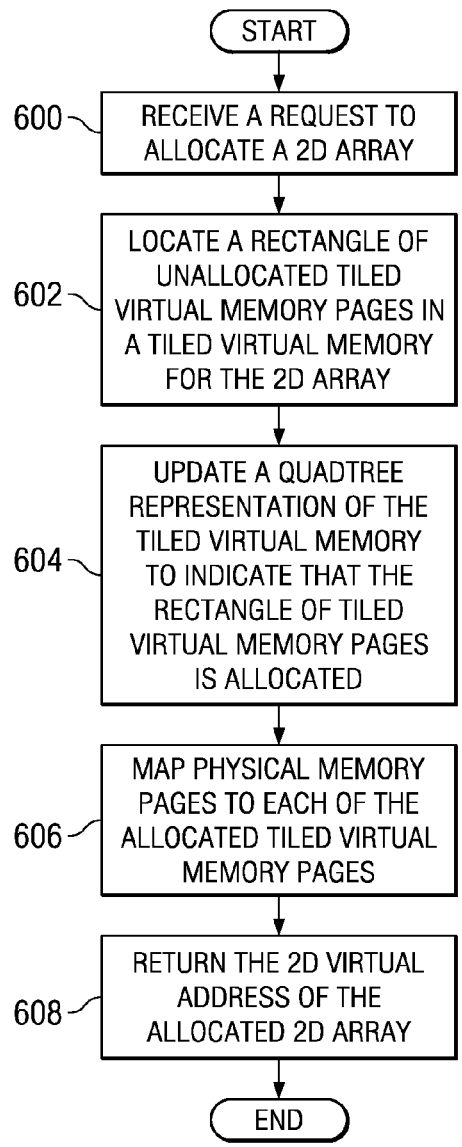
FIGS. 6A and 6B show flow diagrams of methods for tiled virtual memory management in accordance with one or more embodiments of the invention.
Figure 6B:
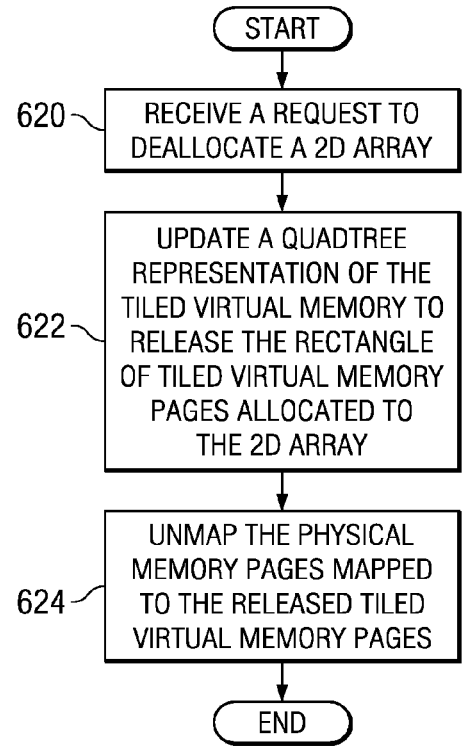

FIGS. 6A and 6B are flow diagrams of methods performed by a tiled virtual memory manager (e.g., the tiled virtual memory manager (402)) to, respectively, allocate and deallocate 2D arrays in a tiled virtual memory (e.g., a container in the tiled virtual memory (404)). These methods are explained with reference to a pseudocode listing provided in Table 1 at the end of this section. This pseudocode is a high level description of the operations used by the tiled virtual memory manager to manipulate the quadtree representation of tiled virtual memory allocations in the container in accordance with one or more embodiments of the invention. This pseudocode is expressed in the Haskell programming language. Information about the Haskell programming language may be found, for example, at haskell.org.

Further, the pseudocode is presented for example purposes only and is not intended to limit the scope of the claimed invention in any way.

The pseudocode defines, among others, a union function for performing the union of two quadtrees, an intersection function for performing the intersection of two quadtrees, a merge function for merging nodes in a quadtree during union and intersection operations, an overlapping function to test if two quadtrees are overlapping, and a mktree function for creating a quadtree from a description of a 2D array (referred to as a framebuffer in the pseudocode).

Further, in the pseudocode, a quadtree is defined with a recursive data type called PageTree which is defined as "data PageTree=Filled|Empty|Node PageTree PageTree PageTree PageTree." This data type is made up of nodes in which some of the nodes may be leaves and others may be subdivided. The | operator means "or" so this statement indicates that a leaf in the quadtree can be either Filled (indicated that pages in the leaf are all allocated) or Empty (indicating that none of the pages in the leaf are allocated). When the quadtree is subdivided, a node is written Node a b c d where a, b, c, and d can be Empty, Filled, or subdivided.

The tiled virtual memory manager initially creates an empty quadtree Q for the tiled virtual memory (see initialTree in Table 1). Then, as the tiled virtual memory manager processes requests to allocate and deallocate 2D arrays in the tiled virtual memory, the tiled virtual memory manager uses functions defined in Table 1 to change Q to reflect the current allocation state of the tiled virtual memory pages in the tiled virtual memory. The tiled virtual memory manager may also use one or more of these functions to find an empty area in the tiled virtual memory to allocate a 2D array.

As shown in FIG. 6A, when the tiled virtual memory manager receives a request to allocate a 2D array in the tiled virtual memory (block 600 of FIG. 6A), the tiled virtual memory manager first locates a rectangle of unallocated tiled virtual memory pages in the tiled virtual memory large enough for the 2D array (block 602 of FIG. 6A). In one or more embodiments of the invention, the tiled virtual memory manager estimates a location for the new 2D array based on what is already allocated in the tiled virtual memory, and then tests the estimated location to make sure that the estimated location does not include any memory pages that are already allocated to other 2D arrays. To test the estimated location, a quadtree Q' is generated that represents the tiled virtual memory with only the new 2D array allocated in the memory at the estimated location (see mktree in Table 1) and Q' is compared to Q to determine if the two quadtrees overlap (see overlapping in Table 1). The process of estimating a location and testing the estimated location is repeated until an acceptable location is found.

Once a rectangle of unallocated tiled virtual memory pages is located for the new 2D array, the quadtree representing the allocation state of the tiled virtual memory, i.e., Q, is updated to indicate that the rectangle of tiled virtual memory pages is allocated (block 604 of FIG. 6A). To update Q, a union operation is performed between Q and Q' (see union in Table 1). This union operation produces another quadtree in which the tiled virtual memory pages in the rectangle are represented as being allocated, and this quadtree becomes Q. After the quadtree is updated, physical memory pages are mapped to each of the tiled virtual memory pages in the rectangle (block 606 of FIG. 6A) and the 2D virtual address of the allocated 2D array is returned (block 608 of FIG. 6A).

As shown in FIG. 6B, when the tiled virtual memory manager receives a request to deallocate a 2D array in the tiled virtual memory (block 620 of FIG. 6B), the tiled virtual memory manager first updates the quadtree representing the allocation state of the tiled virtual memory, i.e., Q, to release the rectangle of tiled virtual memory pages allocated to the 2D array (block 622 of FIG. 6B). In one or more embodiments of the invention, to update Q, a quadtree Q' is generated that represents the tiled virtual memory with only the 2D array allocated (see mktree in Table 1) and an intersection operation is performed between Q and Q' (see intersection in Table 1). This intersection operation produces another quadtree in which the tiled virtual memory pages that were allocated to the 2D array are no longer represented as being allocated, and this updated quadtree becomes Q. After the quadtree is updated, the physical memory pages mapped to each of the released tiled virtual memory pages in the rectangle are unmapped (block 624 of FIG. 6B).

Figure 7:
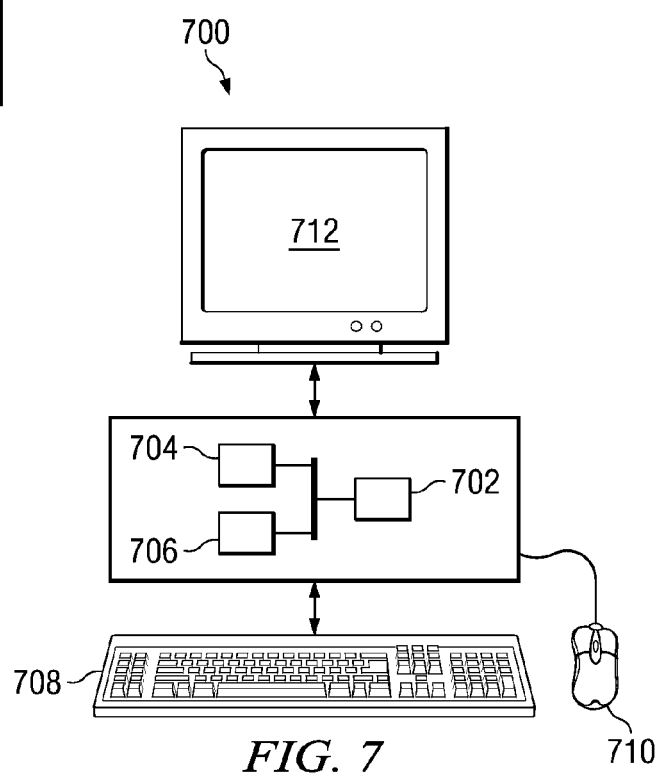
FIG. 7 shows an illustrative digital system in accordance with one or more embodiments of the invention.

Embodiments of the methods and systems for tiled virtual memory management described herein may be implemented for virtually any type of digital system (e.g., a desk top computer, a laptop computer, a handheld device such as a mobile (i.e., cellular) phone, a personal digital assistant, a digital camera, an MP3 player, an iPod, etc.) that executes audio and/or video applications and/or other applications that manipulate two-dimensional data structures. For example, as shown in FIG. 7, a digital system (700) includes a processor (702), associated memory (704), a storage device (706), and numerous other elements and functionalities typical of today's digital systems (not shown). In one or more embodiments of the invention, a digital system may include multiple processors and/or one or more of the processors may be digital signal processors. The digital system (700) may also include input means, such as a keyboard (708) and a mouse (710) (or other cursor control device), and output means, such as a monitor (712) (or other display device). The digital system (700)) may also include an image capture device (not shown) that includes circuitry (e.g., optics, a sensor, readout electronics) for capturing digital images. The digital system (700) may be connected to a network (e.g., a local area network (LAN), a wide area network (WAN) such as the Internet, a cellular network, any other similar type of network and/or any combination thereof) via a network interface connection (not shown). Those skilled in the art will appreciate that these input and output means may take other forms.

Further, those skilled in the art will appreciate that one or more elements of the aforementioned digital system (700) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, or any other computer readable storage device. The software instructions may be distributed to the digital system (700) via removable memory (e.g., floppy disk, optical disk, flash memory, USB key), via a transmission path (e.g., applet code, a browser plug-in, a downloadable standalone program, a dynamically-linked processing library, a statically-linked library, a shared library, compilable source code), etc.

While the invention has been described with respect to a limited number of embodiments, those skilled in the art, having benefit of this disclosure, will appreciate that other embodiments can be devised which do not depart from the scope of the invention as disclosed herein. For example, the methods for managing virtual memory using Boolean shape algebra as described herein may be used for tiled virtual memories of other sizes and configurations, i.e., for any virtual memory scheme in which 2D arrays are allocated as rectangles of contiguous virtual pages. Accordingly, the scope of the invention should be limited only by the attached claims. It is therefore contemplated that the appended claims will cover any such modifications of the embodiments as fall within the true scope and spirit of the invention.

TABLE 1

Haskell Pseudocode module TilerMemManager(
-- * Types
PageTree(..)
, FrameBuffer(..)
, TilerX TABLE 1-continued Haskell Pseudocode

```
, TilerY
-- * Tree creation
, initialTree
, mkTree
-- * Tree manipulation
, union
, intersection
, isEmpty
, overlapping
-- * Tiler dimensions
, maxTilerSize
, tilerWidth
, tilerHeight
-- * for test
, isCovering
, Covered(..)
)
Where
import System.Random
-- | X unit for the Tiler
newtype TilerX = TilerX Int deriving(Show,Eq,Ord,Num,Random,Integral,Enum,Real)
-- | Y unit for the Tiler
newtype TilerY = TilerY Int deriving(Show,Eq,Ord,Num,Random,Integral,Enum,Real)
-- | Width unit for the Tiler
type TilerWidth = TilerX
-- | Height unit for the Tiler
type TilerHeight = TilerY
-- | FrameBuffer for description of framebuffer boundaries
data FrameBuffer = FrameBuffer TilerX TilerY TilerWidth TilerHeight
          deriving(Eq,Show)
-- | Quadtree for the physical pages. Size of a region is implicitly encoded by the depth of the
Leaf in the Tree
data PageTree = Filled -- ^ Filled square
        | Empty -- ^ Empty square
        | Node PageTree PageTree PageTree PageTree
          deriving(Eq,Show)
-- | Max size of the tiler in number of MMU pages (width)
maxTilerSize :: Int
maxTilerSize = 256
-- | Tiler width in MMU pages
tilerWidth :: TilerX
tilerWidth = TilerX maxTilerSize
-- | Tiler height in MMU pages
tilerHeight :: TilerY
tilerHeight = TilerY (maxTilerSize `quot` 2)
-- | Initial empty tree
initialTree :: PageTree
initialTree = Empty
-- | Full container
fullTree :: PageTree
fullTree = Filled
-- | Simplify a node
merge :: PageTree -> PageTree
merge (Node Filled Filled Filled Filled) = Filled
merge a = a
-- | Simplify a tree
simplify :: PageTree -> PageTree
simplify Filled = Filled
simplify Empty = Empty
simplify (Node a b c d) = merge (Node (simplify a) (simplify b) (simplify c) (simplify d))
-- | Union of two trees
union :: PageTree -> PageTree -> PageTree
union Filled _ = Filled
union Empty a = a
union a Empty = a
union _ Filled = Filled
union (Node a b c d) (Node a' b' c' d') = merge $ Node (union a a') (union b b') (union c c')
(union d d')
-- | Intersection of two trees
intersection :: PageTree -> PageTree -> PageTree
intersection Filled a = a
intersection Empty a = Empty
intersection a Empty = Empty
intersection a Filled = a
intersection (Node a b c d) (Node a' b' c' d') = merge $ Node (intersection a a') (intersection b
b') (intersection c c') (intersection d d')
-- | Test if a tree is empty
isEmpty :: PageTree -> Bool
```

TABLE 1-continued

Haskell Pseudocode

```
isEmpty (Empty) = True
isEmpty _ = False
-- | Test to determine if two trees are overlapping
overlapping :: PageTree -> PageTree -> Bool
overlapping a b = not (isEmpty (a `intersection` b))
-- | Create tree from a framebuffer description
mkTree :: FrameBuffer
       -> PageTree
mkTree f = analyzeCoverage (bounded f) (FrameBuffer 0 0 (TilerX maxTilerSize) (TilerY maxTilerSize))
 where
  bounded (FrameBuffer x y w h) = let x' = if x < 0 then 0 else if x >= tilerWidth−1 then
tilerWidth−1 else x
                                     y' = if y < 0 then 0 else if y >= tilerHeight−1 then tilerHeight−1 else y
                                     w' = if x' + w >= tilerWidth then tilerWidth − x' else w
                                     h' = if y' + h >= tilerHeight then tilerHeight − y' else h
                                 in
                                     FrameBuffer x' y' w' h'
-- | Create a tree of fully covered areas
analyzeCoverage :: FrameBuffer -- ^ Framebuffer to analyze
                -> FrameBuffer -- ^ Container area
                -> PageTree -- ^ Page tree
analyzeCoverage f containerArea@(FrameBuffer x y w h) =
   case f `isCovering` containerArea of
     -- Container area is fully covered by the framebuffer
     FullyCovered -> Filled
     -- Container area is not covered by the framebuffer
     NotCovered -> Empty
     -- If partially covering then divide the container area in four parts and check each part
     PartiallyCovered -> if w == 1 && h == 1
                 then
                   error $ "A MMU page cannot be partially covered : " ++ show f ++ " " ++ show containerArea
                 else
                   merge $ Node (analyzeCoverage f (FrameBuffer (x) (y) (w `quot` 2) (h `quot` 2)))
                                (analyzeCoverage f (FrameBuffer (x+(w `quot` 2)) (y) (w `quot` 2) (h `quot` 2)))
                                (analyzeCoverage f (FrameBuffer (x) (y+(h `quot` 2)) (w `quot` 2) (h `quot` 2)))
                                (analyzeCoverage f (FrameBuffer (x+(w `quot` 2)) (y+(h `quot` 2)) (w `quot` 2) (h `quot` 2)))
-- | Covering status
data Covered = FullyCovered
             | PartiallyCovered
             | NotCovered
             Deriving (Eq,Show)
-- | Check if a point if inside a framebuffer
pointIn :: TilerX -> TilerY -> FrameBuffer -> Bool
pointIn x y (FrameBuffer xa ya w h) = xa <= x && x < (xa + w) && ya <= y && y < (ya+h)
-- | check if two framebuffers are overlapping partially, totally, or not at all
isCovering :: FrameBuffer -- ^ a
           -> FrameBuffer -- ^ b
           -> Covered -- ^ Check if a is covering b
isCovering f@(FrameBuffer x' y' w' h') containerArea@(FrameBuffer x y w h) =
            let pa = pointIn x y f
                pb = pointIn (x+w−1) y f
                pc = pointIn x (y+h−1) f
                pd = pointIn (x+w−1) (y+h−1) f
            in
              if pa && pb && pc && pd
                then
                  FullyCovered
                else if x >= x'+w' || x+w <= x' || y >= y'+h' || y+h <= y'
                  then
                    NotCovered
                  else
                    PartiallyCovered
```

What is claimed is:

1. A method for managing a tiled virtual memory in a digital system comprising a tiled virtual memory subsystem, the method comprising:
receiving a request to allocate a two-dimensional (2D) array in the tiled virtual memory;
using a region quadtree to locate a rectangle of unallocated tiled virtual memory pages in the tiled virtual memory for the 2D array, wherein the region quadtree represents a current allocation state of tiled virtual memory pages in the tiled virtual memory;
generating another region quadtree representing the tiled virtual memory with only the tiled virtual memory pages in the rectangle allocated; and
performing a union of the region quadtree and the another region quadtree to generate a new region quadtree representing a new current allocation state of the tiled virtual memory pages in the tiled virtual memory in which the tiled virtual memory pages in the rectangle are represented as being allocated.

2. The method of claim 1, further comprising:
mapping physical memory pages to the tiled virtual memory pages in the rectangle.

3. The method of claim 2, wherein mapping physical memory pages comprises updating a lookup table in the tiled virtual memory subsystem, wherein the lookup table is used to translate tiled virtual memory page addresses to physical memory page addresses.

4. A digital system comprising:
a processor;
a physical memory coupled to the processor;
a tiling engine coupled to the processor and the physical memory, wherein the tiling engine is configured to translate tiled virtual memory addresses in a tiled virtual memory to physical memory addresses in the physical memory; and
a tiled virtual memory manager executable by the processor and configured to manage the tiled virtual memory by:
receiving a request to allocate a two-dimensional (2D) array in the tiled virtual memory;
using a region quadtree to locate a rectangle of unallocated tiled virtual memory pages in the tiled virtual memory for the 2D array, wherein the region quadtree represents a current allocation state of tiled virtual memory pages in the tiled virtual memory;
generating another region quadtree representing the tiled virtual memory with only the tiled virtual memory pages in the rectangle allocated; and
performing a union of the region quadtree and the another region quadtree to generate a new region quadtree representing a new current allocation state of the tiled virtual memory pages in the tiled virtual memory in which the tiled virtual memory pages in the rectangle are represented as being allocated.

5. The digital system of claim 4, further comprising:
mapping physical memory pages to the tiled virtual memory pages in the rectangle.

6. The digital system of claim 5, wherein mapping physical memory pages comprises updating a lookup table in the tiled virtual memory manager, wherein the lookup table is used to translate tiled virtual memory page addresses to physical memory page addresses.

7. A method for managing a tiled virtual memory in a digital system comprising a tiled virtual memory subsystem, the method comprising:
receiving a request to allocate a two-dimensional (2D) array in the tiled virtual memory;
using a region quadtree to locate a rectangle of unallocated tiled virtual memory pages in the tiled virtual memory for the 2D array, wherein the region quadtree represents a current allocation state of tiled virtual memory pages in the tiled virtual memory;
updating the region quadtree to indicate that the tiled virtual memory pages in the rectangle are allocated;
receiving a request to deallocate the 2D array in the tiled virtual memory;
generating another region quadtree representing the tiled virtual memory with only the tiled virtual memory pages in the rectangle allocated; and
performing an intersection of the region quadtree and the another region quadtree to generate a new region quadtree representing a new current allocation state of the tiled virtual memory pages in the tiled virtual memory in which the tiled virtual memory pages in the rectangle are represented as being unallocated.

8. The method of claim 7, further comprising:
unmapping physical memory pages mapped to the tiled virtual memory pages in the rectangle.

9. A digital system comprising:
a processor;
a physical memory coupled to the processor;
a tiling engine coupled to the processor and the physical memory, wherein the tiling engine is configured to translate tiled virtual memory addresses in a tiled virtual memory to physical memory addresses in the physical memory; and
a tiled virtual memory manager executable by the processor and configured to manage the tiled virtual memory by:
receiving a request to allocate a two-dimensional (2D) array in the tiled virtual memory;
using a region quadtree to locate a rectangle of unallocated tiled virtual memory pages in the tiled virtual memory for the 2D array, wherein the region quadtree represents a current allocation state of tiled virtual memory pages in the tiled virtual memory;
updating the region quadtree to indicate that the tiled virtual memory pages in the rectangle are allocated;
receiving a request to deallocate the 2D array in the tiled virtual memory;
generating another region quadtree representing the tiled virtual memory with only the tiled virtual memory pages in the rectangle allocated; and
performing an intersection of the region quadtree and the another region quadtree to generate a new region quadtree representing a new current allocation state of the tiled virtual memory pages in the tiled virtual memory in which the tiled virtual memory pages in the rectangle are represented as being unallocated.

10. The digital system of claim 9, further comprising:
unmapping physical memory pages mapped to the tiled virtual memory pages in the rectangle.

* * * * *